(12) United States Patent
Matsuki

(10) Patent No.: US 7,737,606 B2
(45) Date of Patent: Jun. 15, 2010

(54) INERTIAL DRIVE ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 36 days.

(21) Appl. No.: 12/167,739

(22) Filed: Jul. 3, 2008

(65) Prior Publication Data

US 2009/0015949 A1 Jan. 15, 2009

(30) Foreign Application Priority Data

Jul. 10, 2007 (JP) ............................. 2007-180806

(51) Int. Cl.
*H02N 2/00* (2006.01)
(52) U.S. Cl. ............. 310/323.09; 310/309; 310/316.01; 310/317; 310/323.01
(58) Field of Classification Search ................. 310/309, 310/316.01, 317, 318, 323.01, 323.09, 328, 310/365
See application file for complete search history.

(56) References Cited

U.S. PATENT DOCUMENTS

| | | | |
|---|---|---|---|
| 7,462,974 B2 * | 12/2008 | Matsuki | 310/317 |
| 7,462,975 B2 * | 12/2008 | Matsuki | 310/323.02 |
| 7,535,661 B2 * | 5/2009 | Matsuki | 359/811 |
| 2006/0267450 A1 * | 11/2006 | Matsuki | 310/309 |
| 2008/0018202 A1 * | 1/2008 | Matsuki | 310/323.02 |
| 2008/0278840 A1 * | 11/2008 | Matsuki | 360/71 |

FOREIGN PATENT DOCUMENTS

JP 2003-185406 7/2003

\* cited by examiner

*Primary Examiner*—Thomas M Dougherty
(74) *Attorney, Agent, or Firm*—Scully, Scott, Murphy & Presser, P.C.

(57) ABSTRACT

To provide an inertial drive actuator that is easy to assemble and achieves high accuracy in position detection, the actuator has a fixed member, a vibration substrate, a piezoelectric element (movement unit), first and second moving bodies that moves relative to the vibration substrate by inertia, a first electrode provided on the surface of each of the first and second moving bodies, a second electrode provided on a surface of the vibration substrate, an insulating film provided between the first electrode and the second electrode, a drive unit, and a position detection unit that detects the position of the moving body with respect to the vibration substrate based on capacitance of the portion in which the first electrode and the second electrode are opposed to each other.

14 Claims, 17 Drawing Sheets

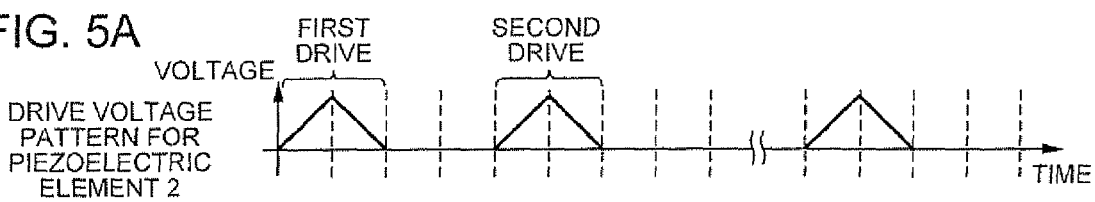

FIG. 5A DRIVE VOLTAGE PATTERN FOR PIEZOELECTRIC ELEMENT 2

FIG. 5B DRIVE VOLTAGE PATTERN FOR SECOND ELECTRODES 31 TO 33

FIG. 5C DRIVE VOLTAGE PATTERN FOR FIRST ELECTRODE 41a

FIG. 5D DRIVE VOLTAGE PATTERN FOR FIRST ELECTRODE 41b

FIG. 5E DRIVE VOLTAGE PATTERN FOR FIRST ELECTRODE 41a (UPON DETECTION)

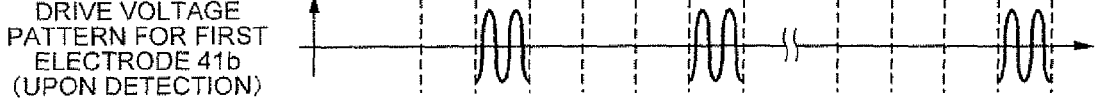

FIG. 5F DRIVE VOLTAGE PATTERN FOR FIRST ELECTRODE 41b (UPON DETECTION)

FIG. 5G OUTPUT WAVEFORM FROM SECOND ELECTRODE 31

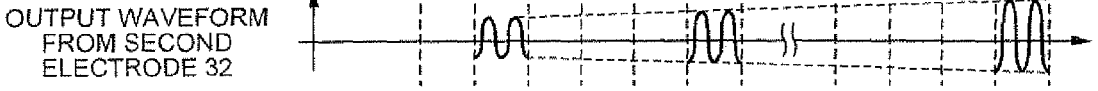

FIG. 5H OUTPUT WAVEFORM FROM SECOND ELECTRODE 32

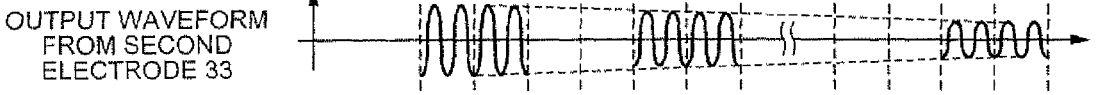

FIG. 5I OUTPUT WAVEFORM FROM SECOND ELECTRODE 33

FIG. 5J OUTPUT OF DIFFERENTIAL AMPLIFIER

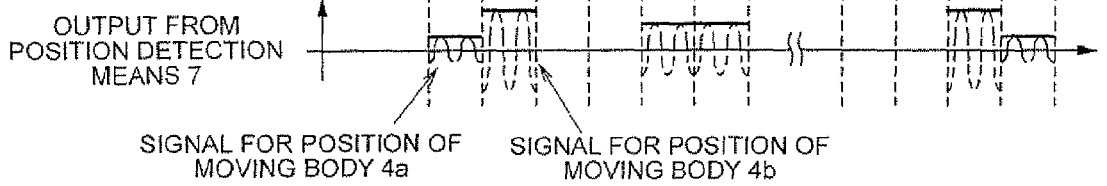

FIG. 5K OUTPUT FROM POSITION DETECTION MEANS 7

SIGNAL FOR POSITION OF MOVING BODY 4a   SIGNAL FOR POSITION OF MOVING BODY 4b

INERTIAL DRIVE ACTUATOR

CROSS-REFERENCE TO RELATED APPLICATION

The present application is based upon and claims the benefit of priority from the prior Japanese Patent Application No. 2007-180806 filed on Jul. 10, 2007; the entire contents of which are incorporated herein by reference.

BACKGROUND OF THE INVENTION

1. Field of the Invention

The present invention relates to an inertial drive actuator.

2. Description of the Related Art

When a drive pulse with a waveform having a moderate rise and a subsequent steep fall is applied to a piezoelectric element, which is a kind of electro-mechanical transducer, the piezoelectric element expands slowly at the moderate rise of the drive pulse and contracts quickly at the steep fall of the drive pulse. There is a known inertial drive actuator that utilizes such characteristics. In the inertial drive actuator, drive pulses having the above described waveform are applied to a piezoelectric element to generate vibration having different speeds in the directions of expansion and contraction in the piezoelectric element thereby causing a drive member fixed to the piezoelectric element to reciprocate at different speeds. Thus, a movable member in frictional contact with the drive member is moved in a predetermined direction.

Japanese Patent Application Laid-Open No. 2003-185406 discloses an inertial drive actuator having a function of detecting the position of a movable member. This inertial drive actuator is shown in FIG. 17. The inertial drive actuator 100 has a piezoelectric element 120, one end of which is fixed on the frame 110 of the actuator by, for example, adhesion. A drive shaft 130 is fixed on the other end of the piezoelectric element 120 by, for example, adhesion. A movable member 140 is in frictional contact with the drive shaft 130. A detection member 150, which constitutes a fixed electrode used to detect the position of the movable member 140 based on capacitance, extends parallel to the moving direction of the movable member 140 while being kept away from the movable member 140. The detection member 150 is fixed on the frame 110. The drive shaft 130, the movable member 140 and the detection member 150 are made of electrically conductive materials. The detection member 150 has projections and depressions that are arranged at regular intervals along the moving direction of the movable member 140 on its surface facing to the movable member 140 to constitute an electrode 151. The electrode 151 and the movable member 140 constitute a capacitor with a gap D therebetween.

When assembling the above described inertial drive actuator 100, the drive shaft 130 and the detection member 150 are required to be assembled in such a way that the spacing and degree of parallelization therebetween is kept within an allowable range. This is because variations in the gap (i.e. spatial variations and changes with time) between the electrodes that constitute a capacitor can deteriorate the detection accuracy in the position detection utilizing capacitance.

In the above described inertial drive actuator 100, however, since the drive shaft 130 and the detection member 150 are provided as separate members, it is difficult to arrange them with good accuracy in terms of the above described spacing and parallelization while paying attention to their axes. Thus, such requirements have been factors that deteriorate efficiency in assembling.

SUMMARY OF THE INVENTION

The present invention has been made in view of the above described situation and has as an object to provide an inertial drive actuator that is easy to assemble and has high position detection accuracy.

To solve the above described problem and achieve the object, an inertial drive actuator according to the present invention comprises a fixed member, a vibration substrate provided on the fixed member, movement unit that causes the vibration substrate to reciprocate relative to the fixed member, a first moving body and a second moving body provided on the vibration substrate that move with reciprocating movement of the vibration substrate by inertia relative to the vibration substrate, a first electrode provided on a surface of each of the first and second moving bodies that faces the vibration substrate, a second electrode provided on a surface of the vibration substrate that faces the first and second moving bodies, an insulating film provided between the first electrode and the second electrode, a drive unit that applies a voltage to cause the movement unit to reciprocate and applies a voltage to cause an electrostatic force to act between the first electrode and the second electrode thereby controlling a frictional force acting between the vibration substrate and the first and second moving bodies, and a position detection unit that detects the position of the moving body relative to the vibration substrate based on the capacitance of a portion in which the first electrode and the second electrode are opposed to each other.

In the inertial drive actuator according to the present invention, it is preferred that while the position detection unit is detecting the position of the first moving body and the second moving body, the drive unit suspend voltage application between the first electrode and the second electrode and voltage application to the moving unit, and the position detection unit apply a voltage for position detection to the first electrode.

In the inertial drive actuator according to the present invention, it is preferred that while the position detection unit is detecting the position of the first moving body and the second moving body, the drive unit suspend voltage application to the second electrode and voltage application to the moving unit, and a voltage for position detection be applied to the first electrode.

In the inertial drive actuator according to the present invention, it is preferred that the first moving body and the second moving body be electric conductors, and the conductors themselves function as the first electrodes.

In the inertial drive actuator according to the present invention, it is preferred that the second electrode be divided into two regions, and the each of the first and second moving bodies be arranged in such a way as to bridge the two divisional regions of the second electrode.

In the inertial drive actuator according to the present invention, it is preferred that the second electrode be divided into three regions, and the first moving body and the second moving body be arranged in such a way as to bridge one common region among the three regions and the other two regions respectively.

In the inertial drive actuator according to the present invention, it is preferred that the aforementioned other two regions be electrically connected to each other.

In the inertial drive actuator according to the present invention, it is preferred that the position detection unit detect the position of the moving body by comparing the capacitances created between the first electrode and the two regions of the second electrode opposed thereto.

In the inertial drive actuator according to the present invention, it is preferred that the two regions of the second electrode be arranged in such a way that increase and decrease in the areas in which the first electrode is opposed to them with movement of the moving body occur along the direction of the movement.

In the inertial drive actuator according to the present invention, it is preferred that the two regions of the second electrode be arranged in such a way that increase and decrease in the areas in which the first electrode is opposed to them with movement of the moving body occur along a direction perpendicular to the direction of the movement.

In the inertial drive actuator according to the present invention, same wiring may used to provide connection from the first and second electrodes to the position detection unit and connection from the first and second electrodes to the drive unit, and the connection may be switched to the drive unit when the first and second moving bodies are to be moved, and to the position detection unit when the positions of the first and second moving bodies are to be detected.

In the inertial drive actuator according to the present invention, it is preferred that a guide made of an insulator that regulates the movement of the first and second moving bodies so that they move along the direction reciprocation of the vibration substrate be provided on the fixed member.

BRIEF DESCRIPTION OF THE DRAWINGS

FIGS. 5A, 5B, 5C, 5D, 5E, 5F, 5G, 5H, 5I, 5J and 5K are timing charts showing drive voltage patterns for the piezoelectric element, the first electrodes, the second electrodes and patterns of outputs from the first electrodes, the second electrodes, a differential amplifier and position detection means, where the vertical axis represents signal voltage and the horizontal axis represents time;

DETAILED DESCRIPTION OF THE INVENTION

In the following, embodiments of the inertial drive actuator according to the present invention will be described in detail with reference to the accompanying drawings. It should be understood that the present invention is not limited by the embodiments.

First Embodiment

In the following, the embodiments of the present invention will be described with reference to the drawings.

Figure 1:
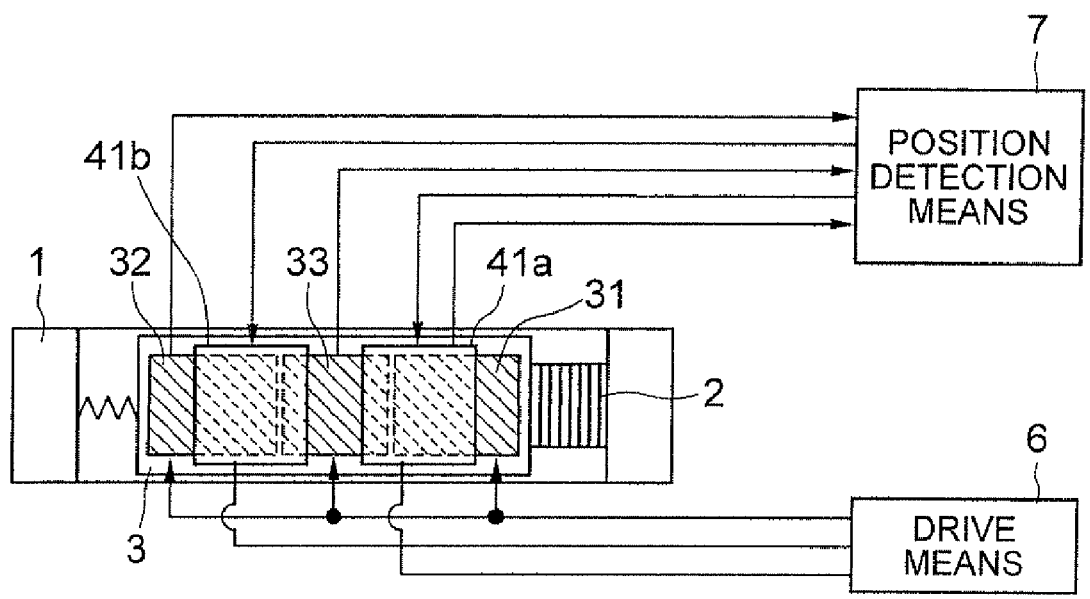
FIG. 1 is a plan view showing the configuration of an inertial drive actuator according to a first embodiment of the present invention.
Figure 2:
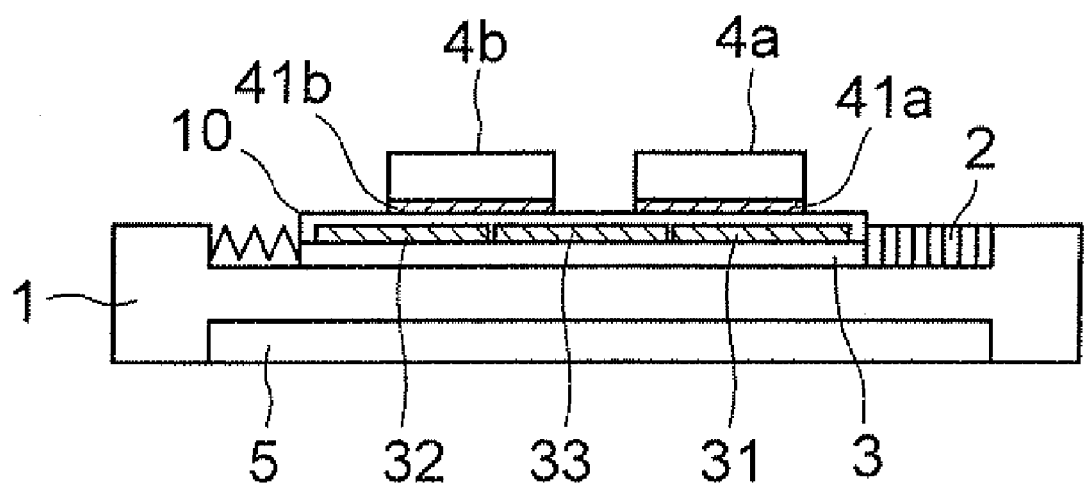
FIG. 2 is a side view showing the configuration of the inertial drive actuator according to the first embodiment of the present invention.
Figure 3A:
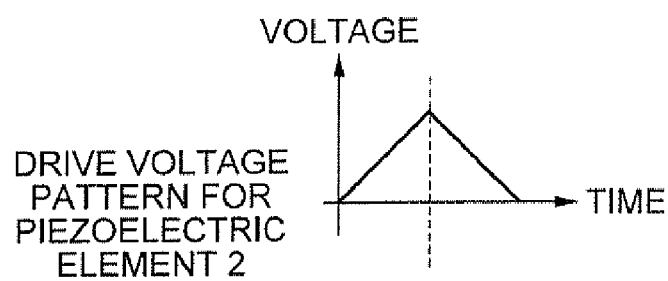
FIGS. 3A, 3B, 3C and 3D are timing charts showing drive voltage patterns for a piezoelectric element, first electrodes, and second electrodes, where the vertical axis represents signal voltage and the horizontal axis represents time.
Figure 3B:
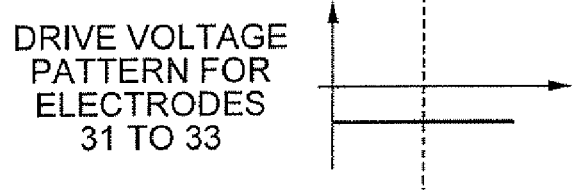
Figure 3C:
Figure 3D:
Figure 4A:
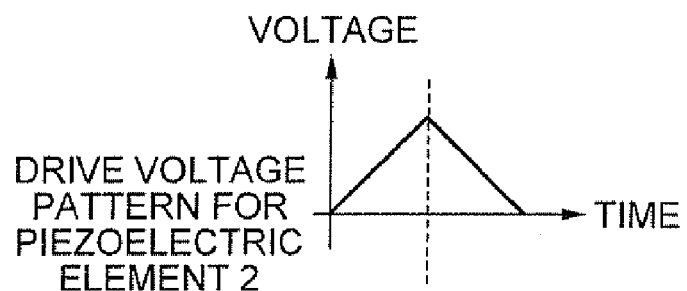
FIGS. 4A, 4B, 4C and 4D are timing charts showing drive voltage patterns for the piezoelectric element, the first electrodes, and the second electrodes, where the vertical axis represents signal voltage and the horizontal axis represents time.
Figure 4B:
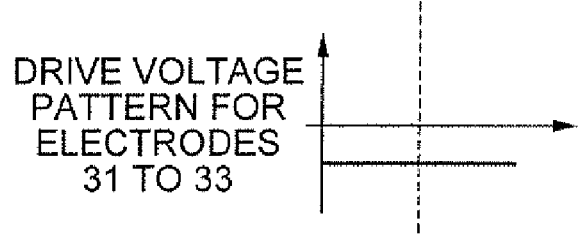
Figure 4C:
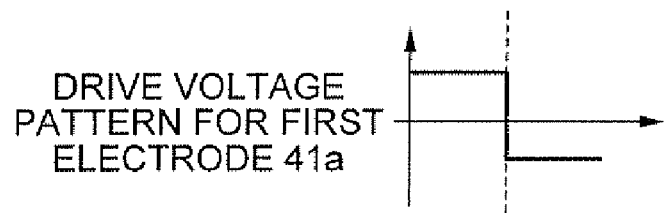
Figure 4D:
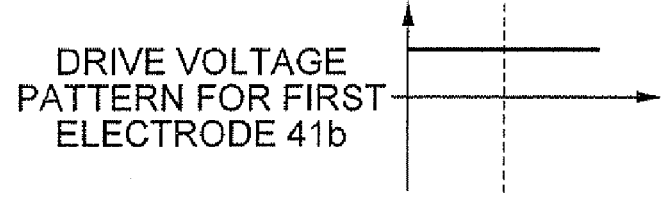

FIGS. 1 and 2 illustrate the configuration of the first embodiment. FIG. 1 is a plan view of an inertial drive actuator according to a first embodiment of the present invention, and FIG. 2 is a side view of the inertial drive actuator according to the first embodiment. The inertial drive actuator has a piezoelectric element 2, one end of which is fixed to a fixed member 1 and the other end of which is fixed to one end of a vibration substrate 3. On the vibration substrate 3 are moving bodies 4a and 4b that can move in the direction of vibration of the piezoelectric element 2. The moving bodies 4a and 4b are juxtaposed along the direction of movement thereof. First electrodes 41a and 41b are provided on the bottom surfaces of the moving bodies 4a and 4b respectively. Second electrodes 31, 32 and 33 are provided on the flat surface of the vibration substrate 3 that is opposed to the first electrodes 41a and 41b. The first electrodes and the second electrodes are opposed to and in contact with each other with an insulating film 10 provided on the second electrodes between.

The first electrode 41a always has a portion opposed to the second electrodes 31 and 33 throughout the range of movement of the moving body 4a. When an electric potential difference is given between the first electrode 41a and the second electrodes 31 and 33 by drive means 6, an electrostatic force acts between the electrodes. A permanent magnet 5 is provided on the side of the vibration substrate 3 that is opposite to the moving body 4a. The permanent magnet 5 extends along the direction of vibration of the vibration substrate 3. The moving body 4a is made of a magnetic material so that a magnetic attractive force acts between the permanent magnet 5 and the moving body 4a. Thus, even if the voltage applied between the first electrode 41a and the second electrodes 31 and 33 is turned off, the moving body 4a is retained at its position by the permanent magnet 5. The above description also applies to the other moving body 4b, which always has a portion opposed to (or overlapping with) the second electrodes 32 and 33 throughout the range of movement of the moving body 4a.

FIGS. 3A to 3D and 4A to 4D show drive waveforms for this actuator. FIGS. 3A to 3D and 4A to 4D are timing charts showing drive voltage patterns for the piezoelectric element, first electrodes and second electrodes, where the vertical axis represents the signal voltage and the horizontal axis represents time. FIGS. 3A to 3D show waveforms of the drive voltages that causes the moving body 4a to move to the left and causes the moving body 4b to move to the right. On the other hand, FIGS. 4A to 4D show waveforms of the drive voltages that causes the moving body 4a to move to the left and does not cause the moving body 4b to move. In the following, the drive principle will be described with reference to FIGS. 3A to 3D. The following argument can also apply to FIGS. 4A to 4D in a similar manner. In the steeply-rising portion of the waveform of the drive voltage applied to the piezoelectric element 2, the piezoelectric element 2 is displaced abruptly to the left, which causes the vibration substrate 3 to move abruptly to the left. At this time, there is a potential difference between the voltage applied to the first electrode 41a and the voltage applied to the second electrodes 31 and 33, and therefore an electrostatic attractive acts between the vibration substrate 3 and the moving body 4a, which leads to an increase in the frictional force. On the other hand, the voltage applied to the other first electrode 41b and voltage applied to the second electrodes 32 and 33 are equal to each other, and therefore no electrostatic attractive force acts between these electrodes. Therefore, while the moving body 4a moves to the left with the displacement of the vibration substrate 3, the moving body 4b tends to stay at its position due to its inertia that overcomes the frictional force between it and the vibration substrate 3.

In the steeply-falling portion of the waveform of the drive voltage applied to the piezoelectric element 2, the piezoelectric element 2 contracts abruptly, which causes the vibration substrate 3 to move abruptly to the right. At this time, the voltage applied to the first electrode 41a and the voltage applied to the second electrodes 31 and 33 are equal to each other, and therefore no electrostatic attractive force acts between these electrodes. On the other hand, there is a difference between the voltage applied to the other first electrode 41b and voltage applied to the second electrodes 32 and 33, and therefore an electrostatic attractive force acts between the vibration substrate 3 and the moving body 4b, which leads to an increase in the frictional force. Therefore, while the moving body 4a tends to stay at its position due to its inertia that overcomes the frictional force between it and the vibration substrate 3, the moving body 4b moves to the right with the movement of the vibration substrate 3.

As the actuator is operated in the above described manner repeatedly, the moving body 4a moves to the left relative to the vibration substrate 3, and the moving body 4b moves to the right relative to the vibration substrate 3. When the moving body 4a is to be moved to the right, a potential difference should be created between the electrodes at the time when the piezoelectric element 2 is caused to contract abruptly. If the moving body 4b is to be moved to the left simultaneously, a potential difference should be created between the electrodes at the time when the piezoelectric element 2 is caused to expands abruptly. The basic drive principle of this actuator is as described above.

Since the frictional force is created by the electrostatic attractive force in synchronization with the piezoelectric oscillation, the moving body moves only while the increased frictional force acts. Thus, the drive efficiency is enhanced, and inertial drive can be achieved without changing the displacement speed of the piezoelectric element 2 between the two opposite displacement directions. Therefore, generation of a complicated waveform in driving the piezoelectric element 2 is eliminated.

Furthermore, since the movement direction and other conditions are determined by applying voltages for attraction respectively to multiple moving bodies 4a, 4b, the moving bodies 4a, 4b can be moved individually only by providing the multiple moving bodies 4a, 4b on a single piezoelectric element 2 and vibration substrate 3. Therefore, an increase in the size of the actuator caused by an increase in the number of moving bodies can be prevented or made small.

In the following, a method of detecting the position of the moving bodies 4a, 4b will be described. Detection of the position of the moving body 4a is also performed using the first electrode 41a and the second electrodes 31 and 33 as with the driving of the actuator. The portion in which the first electrode 41a and the second electrode 31 are opposed to each other and the portion in which the first electrode 41a and the second electrode 33 are opposed to each other can be regarded respectively as capacitors. The position of the moving body 4a relative to the vibration substrate 3 can be detected by comparing the capacitance that corresponds to the area of the portion in which the first electrode 41a and the second electrode 31 are opposed to each other and the capacitance that corresponds to the area of the portion in which the first electrode 41a and the second electrode 33 are opposed to each other, or by determining the difference between these capacitances.

For example, as the moving body 4a is moved to the right, the area in which the first electrode 41a and the second electrode 31 are opposed to each other increases, and the capacitance between the second electrode 31 and the first electrode 41a increases accordingly. On the other hand, the area in which the area in which the first electrode 41a and the second electrode 33 decreases gradually, and the capacitance between the second electrode 33 and the first electrode 41a decreases accordingly. By determining the difference between these capacitances, the position of the moving body 4a can be detected with high accuracy based on the comparison of the capacitances.

With the above described configuration, the first electrodes 41a, 41b and the second electrodes 31, 32, 33 are used as electrodes that generate electrostatic attractive forces acting therebetween in moving the moving bodies 4a, 4b. Furthermore, the positions of the moving body 4a and the moving body 4b can be detected based on the relation between the areas in which the electrodes are opposed to each other. Thus, the area on the surface of the vibration substrate 3 can be utilized efficiently, which is suitable for size reduction.

Since the second electrodes 31, 32, 33 are provided on the same plane (on the surface of the vibration substrate 3), the movement axis of the actuator along which the moving bodies 4a and 4b move and the detection axis for detecting the positions of the moving bodies 4a and 4b coincide with each other. Therefore, misalignment between the movement axis and the detection axis is eliminated, and therefore deterioration of accuracy in position detection due to assembly error can be prevented. In other words, a high degree of accuracy in position detection can be achieved in spite of the structure that is easy to assemble.

By producing the second electrodes 31, 32, 33 on the vibration substrate 3 and the insulating film 10 by a semiconductor process, it is possible to make the gap between the first electrodes 41a, 41b and the second electrodes 31, 32, 33 relating to position detection can be made uniform and as extremely small as several microns or sub-micron or less. Thus, the gap between the electrodes relating to position detection can be kept uniform on the order of several microns or sub-micron, and the detection sensitivity does not vary depending on the detection site. Therefore stable position detection can be achieved.

In the following, a process of drive detection in this embodiment will be described with reference to timing charts of FIGS. 5A to 5K. FIGS. 5A to 5K are timing charts showing patterns of the drive voltages for the piezoelectric element, the first electrodes and the second electrodes, and patterns of the outputs from the first electrodes, the second electrodes, a differential amplifier and position detection means. In FIGS. 5A to 5K, the vertical axis represents the signal voltage, and the horizontal axis represents time. Voltage waveforms for moving the moving bodies 4a and 4b are applied to the piezoelectric element 2, the first electrodes 41a, 41b and the second electrodes 31, 32, 33. In the case shown in FIGS. 5A to 5L, drive voltage waveforms for moving the moving body 4a to the right and moving the moving body 4b to the left are applied in a time series. The movement amount resulting therefrom (i.e. the movement amount per waveform) is typically on the order of sub-microns or microns.

Upon completion of movement of the moving bodies by one drive waveform, the wire connections to the first electrode 41a and the second electrodes 31, 32, 33 are switched from the drive means 6 to the position detection means 7, and a sine wave used for position detection is first applied to the first electrode 41a. At this time, the capacitances between the first electrode 41a and the second electrodes 31 and 33 and a reference capacitor (not shown) provided in the position detection means 7 constitutes a capacitance bridge. The output of the bridge provided in the position detection means 7 is input to the differential amplifier (not shown), whereby a signal indicative of the position of the moving body 4a is obtained. The signal is rectified by, for example, sample holding, whereby position information is obtained as voltage data. In the case of detecting the position of the other moving body 4b, a sine wave used for position detection is applied to the other first electrode 41b in the same manner, whereby the position of the moving body 4b can be detected by a similar process. As per the above, by separating the period during which the moving bodies are moved and the period during which the position detection is performed, position detection using the common electrodes is achieved.

In the first embodiment, separate wire connections are provided for the second electrodes 31, 32 and 33 respectively. However, the two second electrodes 31 and 32 other than the second electrode 33 to which both of the two first electrodes 41a and 41b are opposed may be electrically connected even during the position detection. In the construction of the first embodiment, the first electrode 41a will not be opposed to the second electrode 32, and the first electrode 41b will not be opposed to the second electrode 31. Therefore, even if the second electrode 31 and the second electrode 32 are electrically connected, they do not affect each other. Thus, the number of wires can be decreased and the configuration can be made simpler.

In moving the moving bodies according to FIGS. 5A to 5K, the voltage signals applied to the second electrodes 31, 32, 33 are inverted between the first drive and the second drive. In accordance with this, the voltage signals applied to the first electrodes 41a, 41b are also inverted. In the second drive, however, there is a potential difference between the first electrode 41a and the second electrodes 31, 33 while the piezoelectric element 2 is expanding, as is the case in the first drive, the moving body 4a continues the movement to the left. The above described inversion is performed in view of the fact that if the polarity of the voltage waveform applied to move the moving bodies is always the same, the insulating film 10 provided on the vibration substrate 3 will be charged up to disable the electrostatic attractive force needed in driving.

Figure 6:
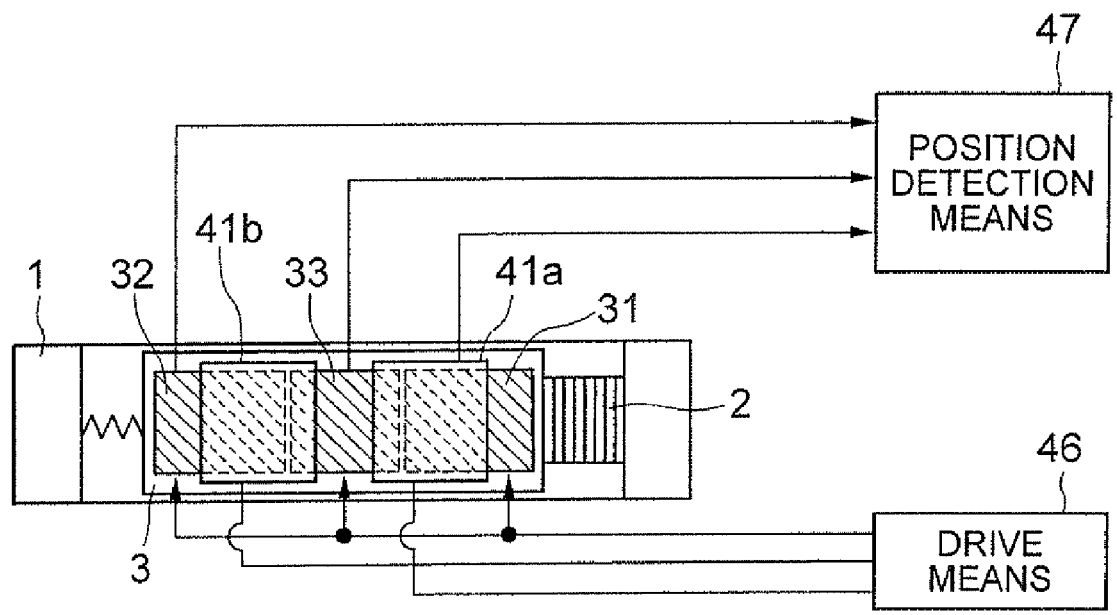
FIG. 6 is a plan view showing the configuration of an inertial drive actuator according to a second embodiment of the present invention.
Figure 7:
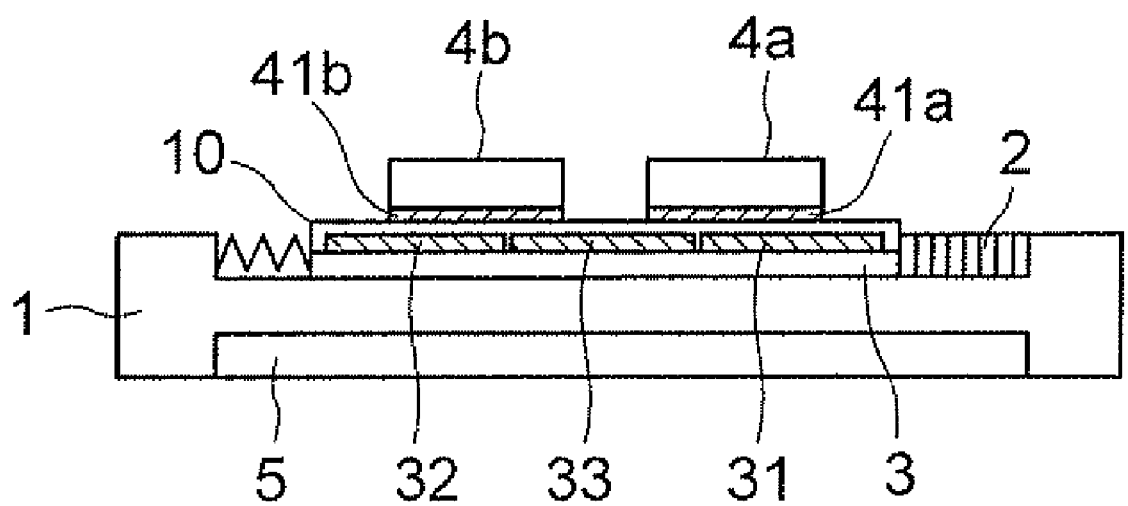
FIG. 7 is a side view showing the configuration of the inertial drive actuator according to the second embodiment of the present invention.

FIG. 6 is a plan view showing the configuration of an inertial drive actuator according to a second embodiment. FIG. 7 is a side view showing the configuration of the inertial drive actuator according to the second embodiment. While in the first embodiment a sine wave is applied to the first electrodes 41a, 41b by the position detection means 7 in detecting the positions of the moving bodies 4a, 4b, in the second embodiment the position detection means 47 does not have such a wave generating function, but a sine wave is generated by the drive means 46. Elimination of the wave generating function from the position detection means 47 makes its configuration simpler.

Figure 8:
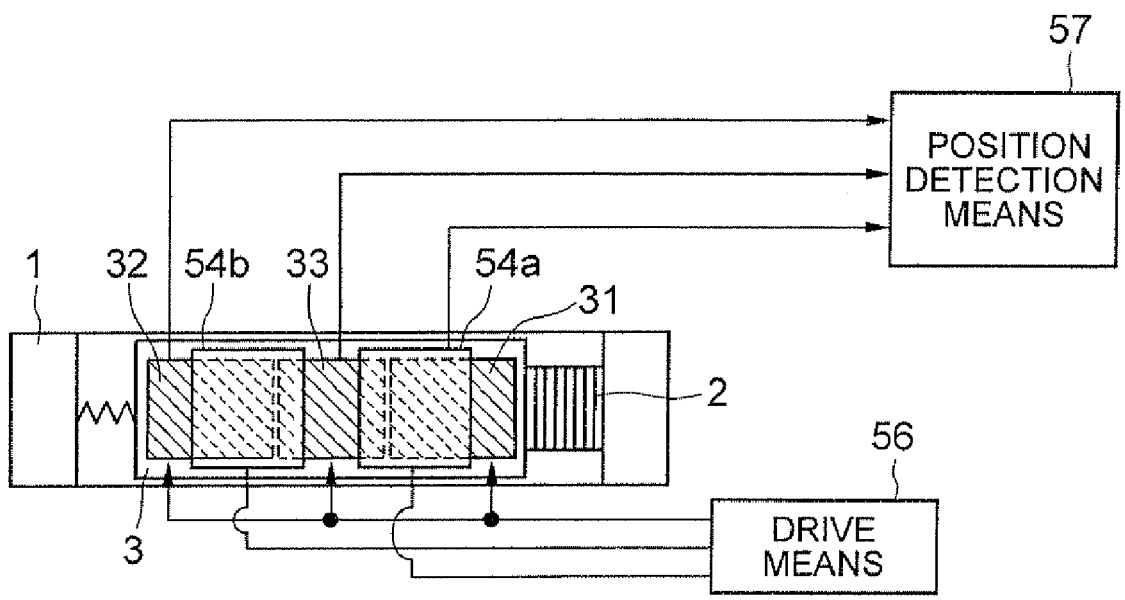
FIG. 8 is a plan view showing the configuration of an inertial drive actuator according to a third embodiment of the present invention.
Figure 9:
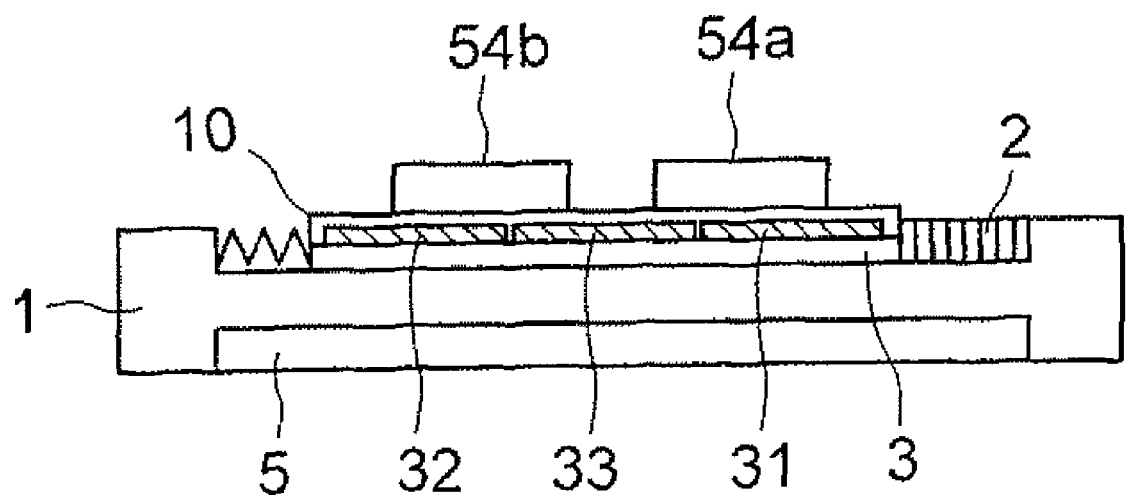
FIG. 9 is a side view showing the configuration of the inertial drive actuator according to the third embodiment of the present invention.

FIG. 8 is a plan view showing the configuration of an inertial drive actuator according to a third embodiment. FIG. 9 is a side view showing the configuration of the inertial drive actuator according to the third embodiment. In the third embodiment, the moving bodies 54a, 54b are made of a conductive material so that they also play the role of the first electrodes 41a, 41b in the first embodiment. To the moving bodies 54a, 54b is connected drive means 56, and to each of the second electrodes 31, 32, 33 are connected the drive means 56 and position detection means 57. This configuration eliminates the need for electrodes additionally provided on the moving bodies. Therefore, the configuration can be simplified, and size reduction can easily be achieved.

Figure 10:
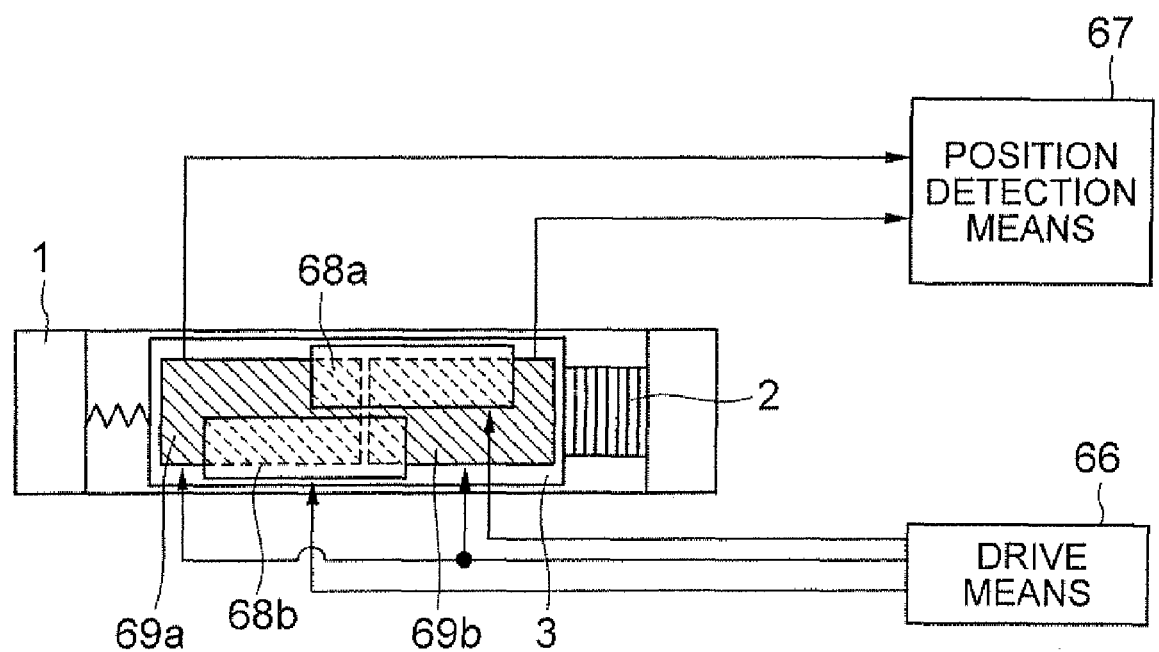
FIG. 10 is a plan view showing the configuration of an inertial drive actuator according to a fourth embodiment of the present invention.
Figure 11:
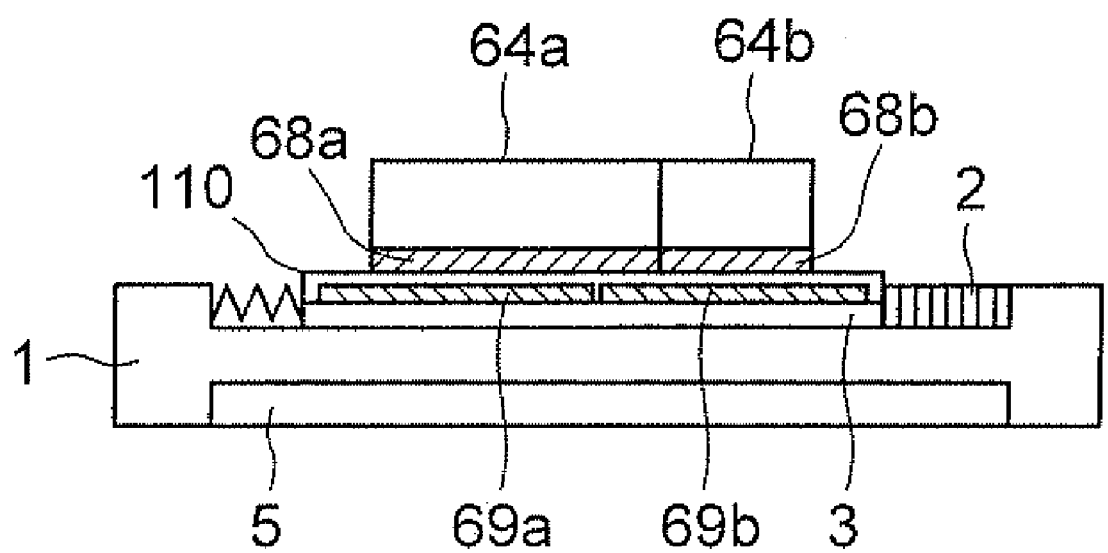
FIG. 11 is a side view showing the configuration of the inertial drive actuator according to the fourth embodiment of the present invention.

FIG. 10 is a plan view showing the configuration of an inertial drive actuator according to a fourth embodiment. FIG. 11 is a side view showing the configuration of the inertial drive actuator according to the fourth embodiment. In the first to third embodiments, the moving bodies are arranged side by side along the moving direction thereof, and the second electrode 31, 32, 33 is divided into three along the moving direction of the moving bodies. On the other hand, in the fourth embodiment, the second electrode 69a, 69b is divided into two along the moving direction, and the two moving bodies 64a, 64b are arranged side by side along the direction perpendicular to the moving direction thereof. The moving bodies 64a, 64b have first electrodes 68a, 68b provided on the bottom surface thereon. To each of the first electrodes 68a, 68b is connected drive means 66. To each of the second electrodes 69a, 69b are connected drive means 66 and position detection means 67. With this configuration, the number of the wire connections to the second electrode can be decreased without any modification to the drive method and detection method, and therefore the configuration can be made simpler.

Figure 12:
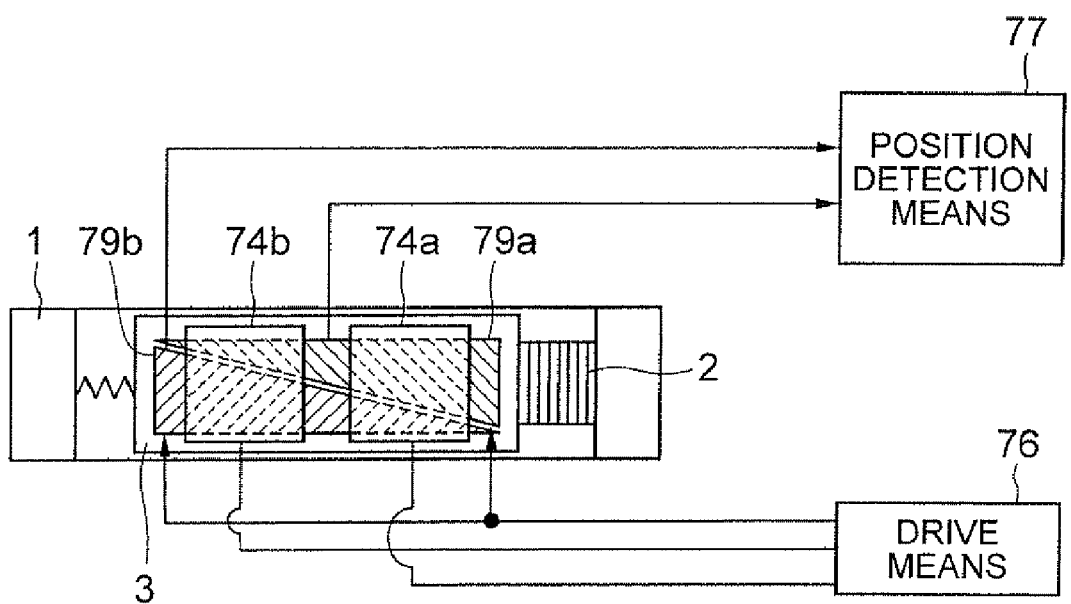
FIG. 12 is a plan view showing the configuration of an inertial drive actuator according to a fifth embodiment of the present invention.
Figure 13:
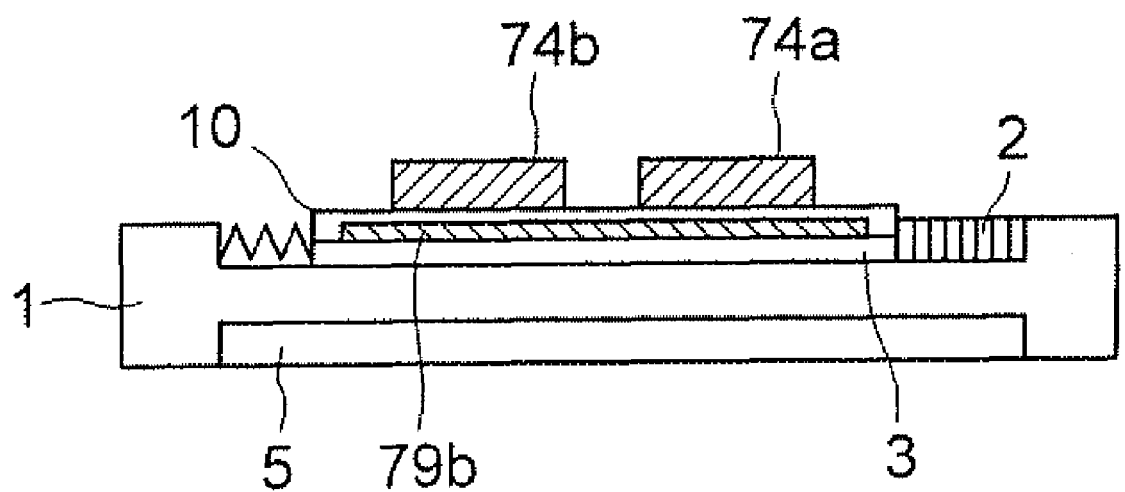
FIG. 13 is a side view showing the configuration of the inertial drive actuator according to the fifth embodiment of the present invention.

FIG. 12 is a plan view showing the configuration of an inertial drive actuator according to a fifth embodiment. FIG. 13 is a side view showing the configuration of the inertial drive actuator according to the fifth embodiment. In the fifth embodiment also, the second electrode is divided into two as with the fourth embodiment. In the fifth embodiment, the moving bodies 74a, 74b are arranged along the moving direction thereof, and the second electrode is divided obliquely relative to the moving direction of the moving bodies 74a, 74b into two second electrodes 79a, 79b. One of the second electrodes 79a, 79b has a width that decreases toward the left along the moving direction of the moving bodies, and the other has a width that decreases toward the right along the moving direction. The moving bodies 74a, 74b are made of a conductive material so as to function as the first electrodes as is the case with the third embodiment. Therefore, the difference in the areas of the portions in which the second electrodes 79a and 79b and each moving body 74a or 74b is created along the direction perpendicular to the moving direction. To each of the moving bodies 74a, 74b is connected drive means 76, and to each of the second electrodes 79a, 79b are connected the drive means 76 and position detection means 77. With this configuration, the number of the wires can be decreased.

Figure 14:
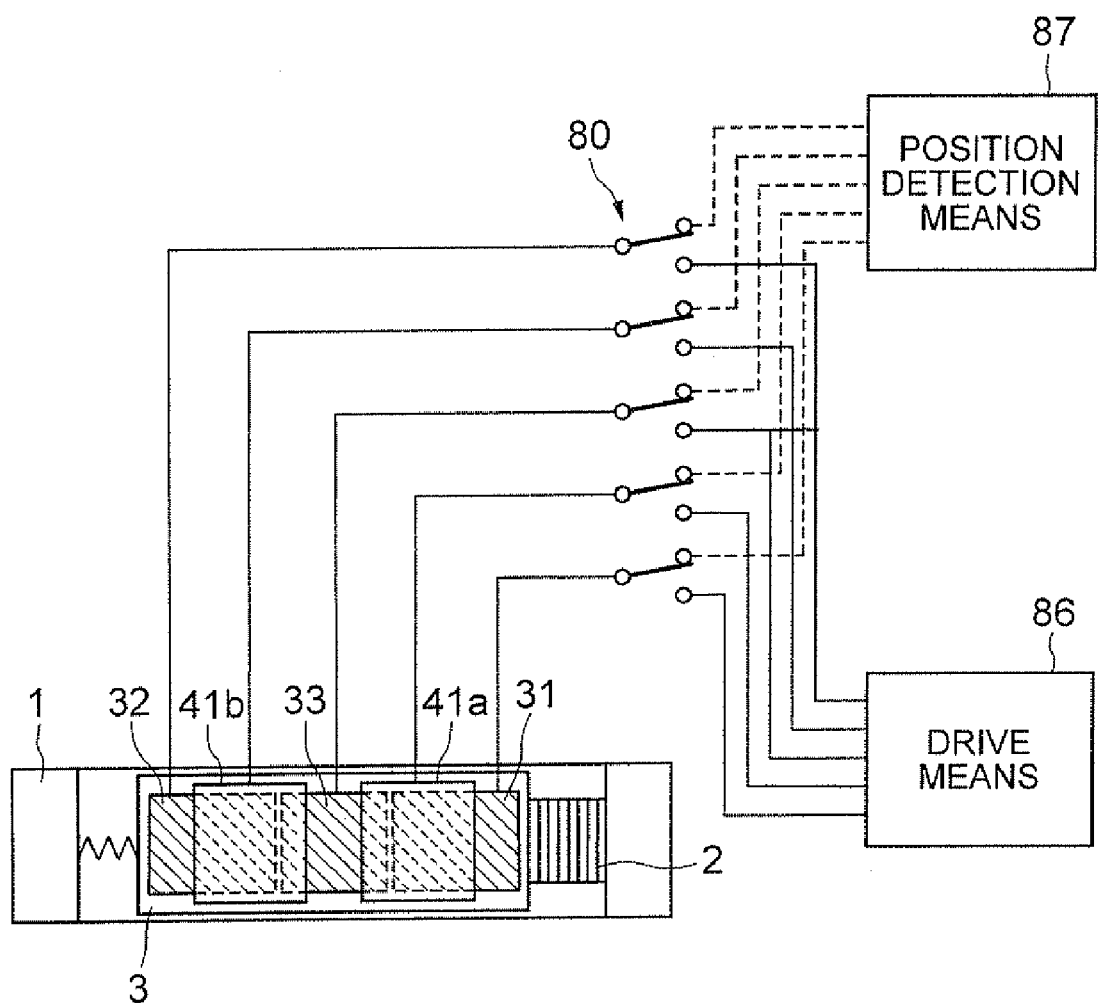
FIG. 14 is a plan view showing the configuration of an inertial drive actuator according to a sixth embodiment of the present invention.

FIG. 14 is a plan view showing the configuration of an inertial drive actuator according to a sixth embodiment. In the first embodiment, wire connections are provided for the drive means 6 and the position detection means 7 respectively. However, in the sixth embodiment as shown in FIG. 14, the wire connections to the drive means 86 and the wire connections to the position detection means 87 can be switched over by a switch 80. With this configuration, the number of wires can be decreased.

Figure 15:
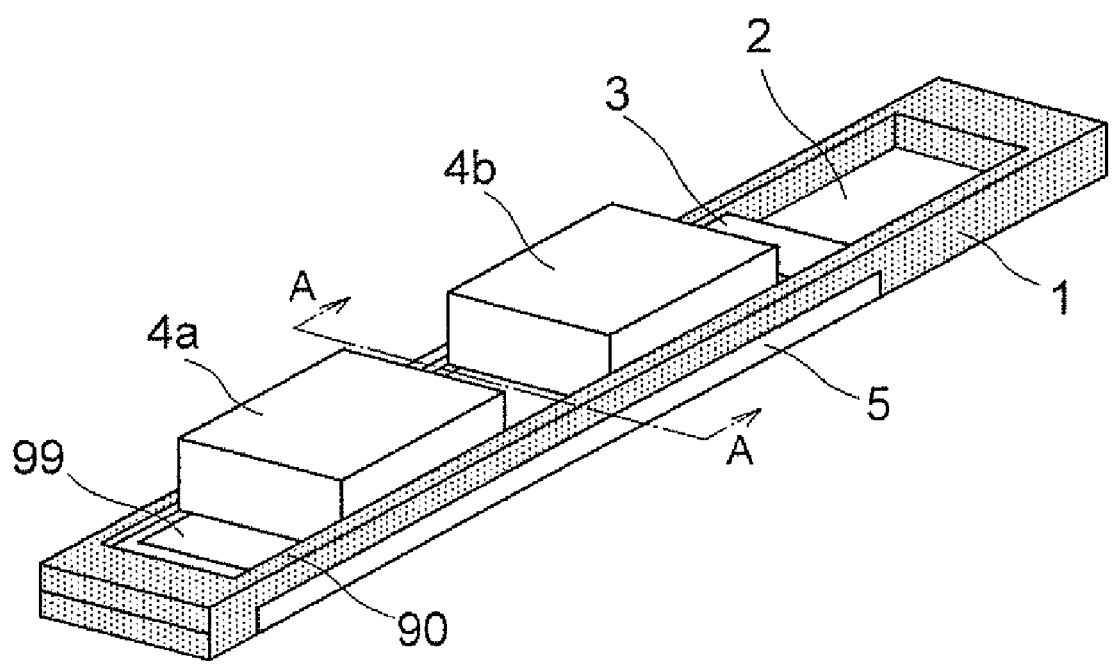
FIG. 15 is a perspective view showing the configuration of an inertial drive actuator according to a seventh embodiment of the present invention.
Figure 16:
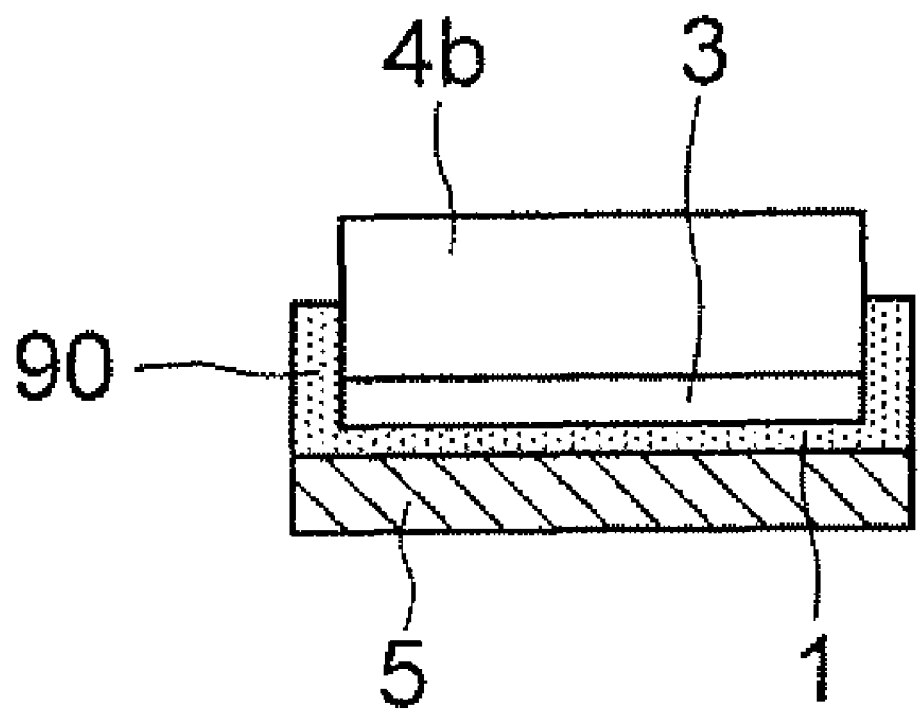
FIG. 16 is a cross sectional view taken along line A-A in FIG. 15.
Figure 17:
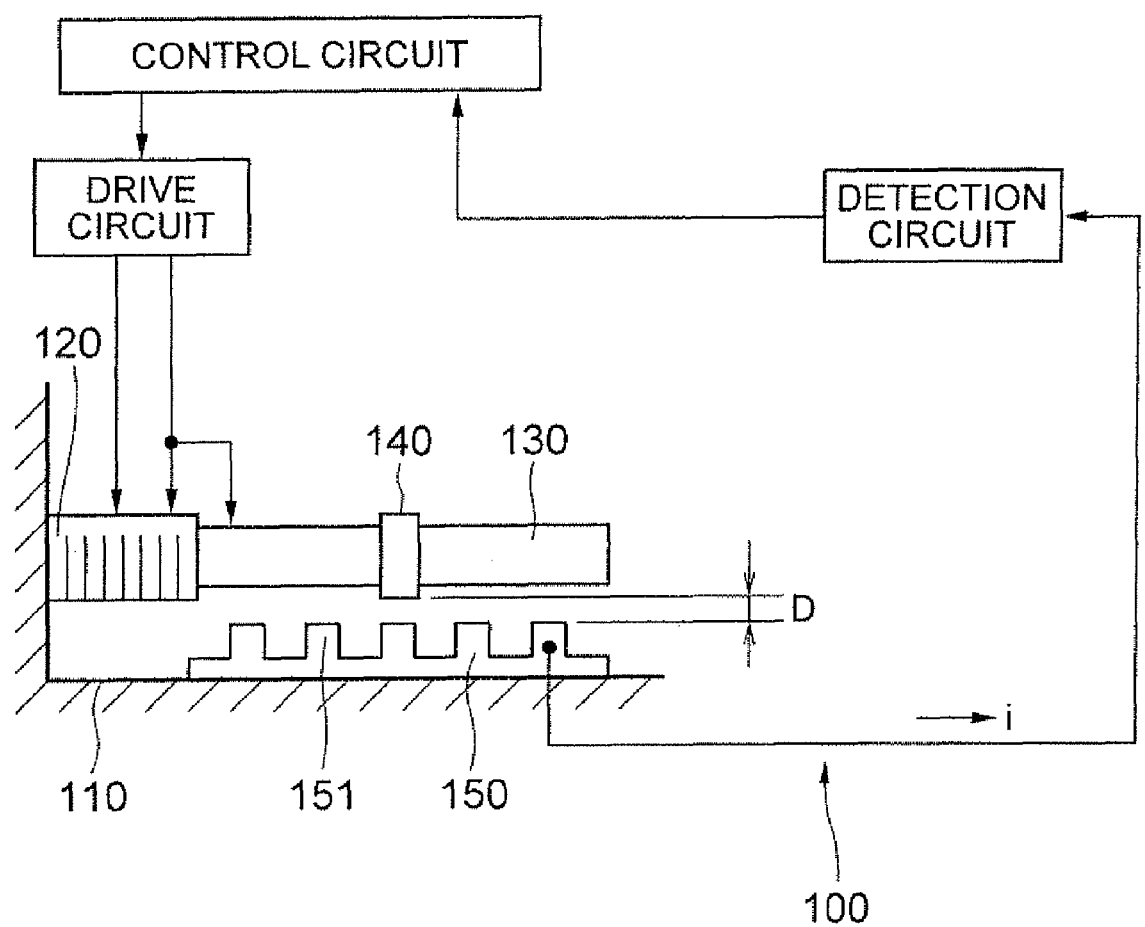
FIG. 17 is a diagram showing the configuration of a conventional inertial drive actuator.

FIG. 15 is a perspective view of an inertial drive actuator according to the seventh embodiment. FIG. 16 is a cross sectional view taken along line A-A in FIG. 15. As described before, since the area of the portion in which the first electrode and the second electrode are opposed to each other changes depending on the position of the moving body, there is a correspondence between position of the moving body and the capacitance. However, if the moving body deviates from the vibration substrates while it moves on the vibration substrates, the correspondence between the area of the portion in which the first electrode and the second electrode are opposed to each other and the position of the moving body is no longer possible. In view of this, in the seventh embodiment as shown in FIG. 15, a guide 90 is provided on the fixed member 1 to guide the moving bodies 4a, 4b to move along the longitudinal direction of the vibration substrate 3. Thanks to the guide 90, the area of the portion in which the first electrode provided on the moving body 4a, 4b and the second electrode provided on the vibration substrate 3 changes with reliability in accurate correspondence with the position of the moving body 4a, 4b. Therefore, the accuracy of position detection can be enhanced. In the case where the moving bodies 4a, 4b are made of a conductive material so as to have the function of the first electrodes, the guide 90 is made of an insulator, since use of a conductive guide 90 results in short circuit between the moving bodies 4a and 4b.

As per the above, the inertial drive actuator according to the present invention can be advantageously used to move a small moving body by a small displacement. In particular, it is suitable for use in driving an optical system of a camera for a mobile phone or an endoscope.

The inertial drive actuator according to the present invention is advantageous in that it is easy to assemble and achieves high accuracy in position detection.

What is claimed is:

1. An inertial drive actuator comprising:
 a fixed member;
 a vibration substrate provided on the fixed member;
 movement unit that causes the vibration substrate to reciprocate relative to the fixed member;
 a first moving body and a second moving body provided on the vibration substrate that move with reciprocating movement of the vibration substrate by inertia relative to the vibration substrate;
 a first electrode provided on a surface of each of the first and second moving bodies that faces the vibration substrate;
 a second electrode provided on a surface of the vibration substrate that faces the first and second moving bodies;
 an insulating film provided between the first electrode and the second electrode;
 a drive unit that applies a voltage to cause the movement unit to reciprocate and applies a voltage to cause an electrostatic force to act between the first electrode and the second electrode thereby controlling a frictional force acting between the vibration substrate and the first and second moving bodies; and
 a position detection unit that detects the position of the moving body with respect to the vibration substrate based on the capacitance of a portion in which the first electrode and the second electrode are opposed to each other.

2. An inertial drive actuator according to claim 1, wherein while the position detection unit is detecting the position of the first moving body and the second moving body, the drive unit suspends voltage application between the first electrode and the second electrode and voltage application to the moving unit, and the position detection unit applies a voltage for position detection to the first electrode.

3. An inertial drive actuator according to claim 1, wherein while the position detection unit is detecting the position of the first moving body and the second moving body, the drive unit suspends voltage application to the second electrode and voltage application to the moving unit, and a voltage for position detection is applied to the first electrode.

4. An inertial drive actuator according to claim 1, wherein the first moving body and the second moving body are electric conductors, and the conductors themselves function as the first electrodes.

5. An inertial drive actuator according to claim 1, wherein the second electrode is divided into two regions, and the each of the first and second moving bodies is arranged in such a way as to bridge the two divisional regions of the second electrode.

6. An inertial drive actuator according to claim 5, wherein the position detection unit detects the position of the moving body by comparing capacitances created between the first electrode and the two regions opposed thereto.

7. An inertial drive actuator according to claim 5, wherein the two regions of the second electrode are arranged in such a way that increase and decrease in the areas in which the first electrode is opposed to them with movement of the moving body occur along the direction of the movement.

8. An inertial drive actuator according to claim 5, wherein the two regions of the second electrode are arranged in such a way that increase and decrease in the areas in which the first electrode is opposed to them with movement of the moving body occur along a direction perpendicular to the direction of the movement.

9. An inertial drive actuator according to claim 1, wherein the second electrode is divided into three regions, and the first moving body and the second moving body are arranged in such a way as to bridge one common region among the three regions and the other two regions respectively.

10. An inertial drive actuator according to claim 9, wherein said other two regions are electrically connected to each other.

11. An inertial drive actuator according to claim 9, wherein the position detection unit detects the position of the moving body by comparing capacitances created between the first electrode and the two regions opposed thereto.

12. An inertial drive actuator according to claim 9, wherein the two regions of the second electrode that are opposed to the first electrode on one of the moving bodies are arranged in such a way that increase and decrease in the areas in which the first electrode is opposed to them with movement of the moving body occur along the direction of the movement.

13. An inertial drive actuator according to claim 1, wherein same wiring is used to provide connection from the first and second electrodes to the position detection unit and connection from the first and second electrodes to the drive unit, the connection being switched to the drive unit when the first and second moving bodies are to be moved, and to the position detection unit when the positions of the first and second moving bodies are to be detected.

14. An inertial drive actuator according to claim 1, wherein a guide made of an insulator that regulates the movement of the first and second moving bodies so that they move along the direction reciprocation of the vibration substrate is provided on the fixed member.

* * * * *